(12) United States Patent
Stewart et al.

(10) Patent No.: US 11,288,287 B2
(45) Date of Patent: *Mar. 29, 2022

(54) METHODS AND APPARATUS TO PARTITION A DATABASE

(71) Applicant: McAfee, LLC, Santa Clara, CA (US)

(72) Inventors: Brian Howard Stewart, Idaho Falls, ID (US); Brian Roland Rhees, Idaho Falls, ID (US); Seth D. Grover, Idaho Falls, ID (US)

(73) Assignee: McAfee, LLC, San Jose, CA (US)

( * ) Notice: Subject to any disclaimer, the term of this patent is extended or adjusted under 35 U.S.C. 154(b) by 476 days.

This patent is subject to a terminal disclaimer.

(21) Appl. No.: 16/050,705

(22) Filed: Jul. 31, 2018

(65) Prior Publication Data

US 2020/0042538 A1 Feb. 6, 2020

(51) Int. Cl.
*G06F 16/27* (2019.01)
*G06F 16/2455* (2019.01)

(52) U.S. Cl.
CPC ...... *G06F 16/278* (2019.01); *G06F 16/24553* (2019.01)

(58) Field of Classification Search
CPC .. G06F 16/278; G06F 16/245; G06F 16/2282; G06F 3/0689; G06F 3/062; G06F 3/0644
See application file for complete search history.

(56) References Cited

U.S. PATENT DOCUMENTS

| | | | |
|---|---|---|---|
| 6,480,839 B1 | 11/2002 | Whittington et al. | |
| 8,412,713 B2 | 4/2013 | Stewart et al. | |
| 2006/0143383 A1 | 6/2006 | Zohar et al. | |
| 2010/0198830 A1 | 8/2010 | Stewart et al. | |
| 2011/0167239 A1 | 7/2011 | Horn et al. | |
| 2011/0196822 A1 | 8/2011 | Zunger et al. | |
| 2017/0024161 A1* | 1/2017 | Katiyar | G06F 3/0689 |
| 2017/0277747 A1* | 9/2017 | Tremayne | G06F 16/2425 |
| 2019/0005262 A1 | 1/2019 | Surla et al. | |
| 2020/0042538 A1 | 2/2020 | Stewart et al. | |

OTHER PUBLICATIONS

United States Patent and Trademark Office, "Non-Final Office Action," dated Sep. 16, 2020 in connection with U.S. Appl. No. 16/050,712, 30 pages.

United States Patent and Trademark Office, "Notice of Allowance," dated Mar. 31, 2021 in connection with U.S. Appl. No. 16/050,712, 17 pages.

\* cited by examiner

*Primary Examiner* — Aleksandr Kerzhner
*Assistant Examiner* — Maher N Algibhah
(74) *Attorney, Agent, or Firm* — Hanley, Flight & Zimmerman, LLC

(57) ABSTRACT

Methods, apparatus, systems and articles of manufacture to partition a database are disclosed. An example apparatus includes a dimension identifier to identify at least two dimensioning values associated with a received query, the query including unstructured data to be written to a database. A partition manager is to select a partition into which data is to be written based on the at least two dimensioning values. At least one of the at least two dimensioning values being a variant of unstructured data associated with the query. A partition creator is to, in response to the selected partition not existing in the database, create the selected partition. A data writer is to write the data to the selected partition.

15 Claims, 6 Drawing Sheets

| PARTITION 1 | | | |
|---|---|---|---|
| TENANT_1 | VARIANT_1 | TIME_0 | DATA_A |
| TENANT_2 | VARIANT_1 | TIME_1 | DATA_B |
| TENANT_3 | VARIANT_2 | TIME_2 | DATA_C |
| TENANT_1 | VARIANT_2 | TIME_3 | DATA_D |
| TENANT_3 | VARIANT_1 | TIME_4 | DATA_E |
| TENANT_2 | VARIANT_2 | TIME_5 | DATA_F |
| TENANT_1 | VARIANT_3 | TIME_6 | DATA_G |
| TENANT_3 | VARIANT_3 | TIME_7 | DATA_H |
| TENANT_2 | VARIANT_3 | TIME_8 | DATA_I |
| TENANT_1 | VARIANT_1 | TIME_9 | DATA_J |

| PARTITION 2 | | | |
|---|---|---|---|
| TENANT_1 | VARIANT_2 | TIME_10 | DATA_K |
| TENANT_1 | VARIANT_3 | TIME_11 | DATA_L |
| TENANT_3 | VARIANT_2 | TIME_12 | DATA_M |
| TENANT_1 | VARIANT_2 | TIME_13 | DATA_N |
| TENANT_2 | VARIANT_3 | TIME_14 | DATA_O |
| TENANT_2 | VARIANT_2 | TIME_15 | DATA_P |
| TENANT_3 | VARIANT_2 | TIME_16 | DATA_Q |
| TENANT_3 | VARIANT_3 | TIME_17 | DATA_R |
| TENANT_2 | VARIANT_1 | TIME_18 | DATA_S |
| TENANT_1 | VARIANT_3 | TIME_19 | DATA_T |

| PARTITION 3 | | | |
|---|---|---|---|
| TENANT_3 | VARIANT_1 | TIME_20 | DATA_U |
| TENANT_2 | VARIANT_3 | TIME_21 | DATA_V |
| TENANT_3 | VARIANT_2 | TIME_22 | DATA_W |
| TENANT_1 | VARIANT_1 | TIME_23 | DATA_X |
| TENANT_2 | VARIANT_1 | TIME_24 | DATA_Y |
| TENANT_2 | VARIANT_2 | TIME_25 | DATA_Z |
| TENANT_3 | VARIANT_1 | TIME_26 | DATA_AA |
| TENANT_3 | VARIANT_3 | TIME_27 | DATA_BB |
| TENANT_1 | VARIANT_3 | TIME_28 | DATA_CC |
| TENANT_2 | VARIANT_2 | TIME_29 | DATA_DD |

METHODS AND APPARATUS TO PARTITION A DATABASE

FIELD OF THE DISCLOSURE

This disclosure relates generally to database structures, and, more particularly, to methods and apparatus to partition a database.

BACKGROUND

Databases are commonly used to store data in an organized format. In some cases, large amounts of data may be stored in such a database. Some database structures utilize partitions to organize larger volumes of data and improve performance when accessing those larger volumes of data.

BRIEF DESCRIPTION OF THE DRAWINGS

FIG. 1 is a block diagram illustrating an example approach to partitioning data using a time value.

The figures are not to scale. In general, the same reference numbers will be used throughout the drawing(s) and accompanying written description to refer to the same or like parts.

DETAILED DESCRIPTION

Figure 2:
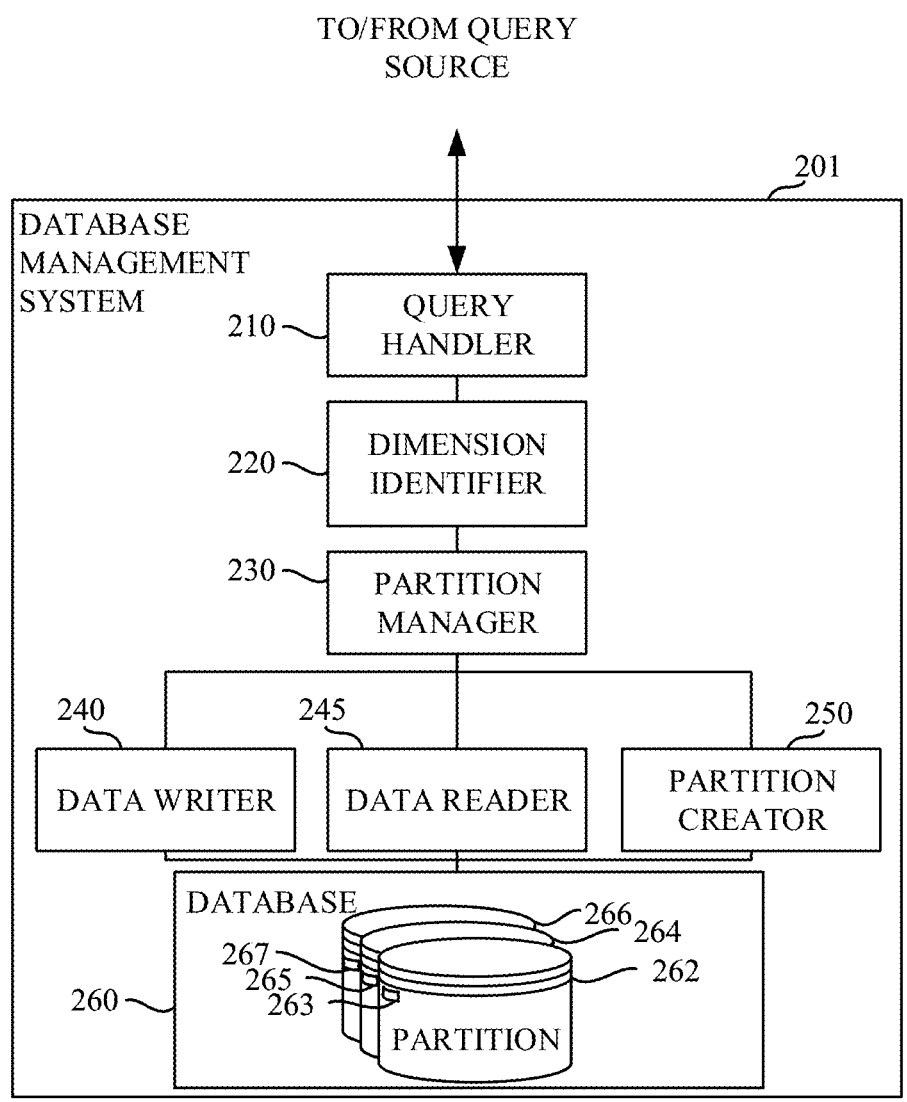
FIG. 2 is a block diagram of an example database system for efficiently partitioning a database.

Databases are used to store data in an organized format. In some examples, large amounts of data are stored. Databases may be used to store, for example, event data. Storing large amounts of data in a single table and/or file may result in performance issues when retrieving data from that table and/or file and/or when writing data to that table and/or file. To address this, database systems commonly divide data within a single database into partitions to enable the ease of automatic data management (partition roll-off/deletion), enable faster drill-down to relevant data, and enable a more efficient path to restoring data. As used herein, a partition is a division of a logical database or elements thereof into separate elements.

Different partitioning schemes exist. For example, range partitioning allows ranges of records to be grouped together in particular partitions based on a value of the record falling into a particular range. List partitioning enables records to be grouped together in particular partitions based on a value of the record matching a particular value and/or set of values. Composite partitioning allows for combinations of different partitioning schemes to be used in connection with each other. However, database partitions are typically partitioned along a single value. In many cases, that single value is a timestamp (e.g., time-based partitioning). In many examples, such a partitioning approach is insufficient and/or inefficient, as such an approach might actually decrease performance when retrieving data from that table and/or file and/or when writing data to that table and/or file.

Database partitioning is particularly useful in the context of security information and event management (SIEM) systems. SIEM systems enable a combination of security information management and security event management, and provide for real-time analysis of security events/alerts generated by various hardware, systems, applications, etc. Such systems typically collect enormously large amounts of data (e.g., gigabytes of data per second). In such scenarios, efficiently organizing such data is important. NitroEDB is an example relational database management system (RDBMS) that enables the use of flexTables. FlexTables are data tables that allow for unstructured data to be stored in a structured database. FlexTables utilize a variant ID to identify the particular variant of the unstructured data. For example, address data may have a number of different variants. For example, a first variant may include a street address, a six digit zip code, and a state; while a second variant may include the street address, a ten digit zip code, a city, a state, and a country. FlexTables enables both variants to be stored in a same column of a table, even though the data is formatted differently.

Example approaches disclosed herein enable data partitioning along multiple dimensions, including a variant of a FlexTable. As a result, data stored in the database can be grouped or organized into many levels of categorizations. Such organization approaches enable greater control on how data is separated and thereby searched, maintained, and rebuilt. Such an approach was not possible through previous methods of simply segregating the data by time. Example approaches disclosed herein enable the use of additional dimensions in connection with the data partitioning scheme. The use of the additional dimensions acts as an indexing technique at the data partitioning level, thereby enabling faster data retrieval.

FIG. 1 is a diagram 100 illustrating three example data partitions 110, 120, 130 that are segmented by time. In the illustrated example of FIG. 1, a first partition 110 corresponds to time entries within boundaries of Time_0 through Time_9. A second partition 120 corresponds to time entries within boundaries of Time_10 through Time_19. A third partition 130 corresponds to time entries within boundaries of Time_20 through Time_29. In the illustrated example of FIG. 1, the data elements within each of the partitions 110, 120, 130 identify tenant and variant information, as well as additional data. For example, a record having Time_0 has a tenant of 1, a variant of 1, and data A. Of course, any other tenant identifier, variant identifier, and/or data may additionally or alternatively be stored.

In examples disclosed herein, the tenant identifier identifies a tenant (e.g., a customer, a user, etc.) with which the data is associated. In some database systems (e.g., cloud database systems), multiple tenants may use the same database, and only be granted access to their data. Using such a multi-tenant database system increases efficiency in resource utilization by reducing system overhead (e.g., operational overhead, resource overhead, installation overhead, etc.) when compared with providing separate database systems for each tenant.

In examples disclosed herein, the data is unstructured data having a format identified by its corresponding variant identifier. However, in some examples, the data may be structured data. Because the example data is unstructured, the data fields used to store that information must account for the largest variant (e.g., type, format, etc.) of such data. That is, while a first variant might store ten bytes of data, a second variant might store one hundred bytes of data. To accommodate the second variant, the data field must allow at least one hundred bytes of data to be stored. Thus, when storing data using the first variant (e.g., ten bytes of data), the additional ninety bits of data is unused. While such an approach reduces storage efficiency (e.g., there is some wasted storage space), performance is improved as data can be written to a single field rather than having to be split into multiple different fields.

FIG. 2 is a block diagram of an example database system 201 for efficiently partitioning a database. The example database system includes a query handler 210, a dimension identifier 220, a partition manager 230, a data writer 240, a data reader 245, a partition creator 250, and a database 260. The example query handler 210 receives a query (e.g., an instruction to read and/or write data to a database) from a query source. The example dimension identifier 220 of the example database system 201 analyzes the received query to identify a dimension (e.g., a variant, a tenant, a timestamp) associated with the query. In some examples, more than one dimension may be identified. The example partition manager 230 then selects a corresponding partition(s) to be written to and/or read from. In some examples, the partition may not yet exist, in which case the partition manager 230 may interact with the partition creator to create the partition 250. The partition manager 230, using the example data writer 240 and/or the example data reader 245, then executes the query against the database 260 and a result is returned to the query source via the query handler 210.

In the illustrated example of FIG. 2, the example query handler 210 is implemented by a hardware logic circuit. However, any other type of circuitry may additionally or alternatively be used such as, for example, one or more analog or digital circuit(s), logic circuits, programmable processor(s), Application Specific Integrated Circuit(s) (ASIC(s)), Programmable Logic Device(s) (PLD(s)), Field Programmable Logic Device(s) (FPLD(s)), Digital Signal Processor(s) (DSP(s)), etc. The example query handler 210 of the illustrated example of FIG. 2, accesses queries to be executed against the database. In examples disclosed herein, a query includes data to be written and/or instructions on what data is to be read from a database. However, a query may include any other information such as a command that is to be executed against the database. In examples disclosed herein, the query handler provides a response to the query source. In some examples, the response may indicate that the query was executed successfully.

In the illustrated example of FIG. 2, the example dimension identifier 220 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. The example dimension identifier 220 of the illustrated example of FIG. 2 analyzes data to be written to and/or read from the database to determine dimensioning values for that data. In examples disclosed herein, multiple dimensioning values are identified such as, for example, a tenant identifier, a variant identifier, a time identifier, etc. In some examples, the variant identifier is determined by inspecting data (e.g., unstructured data) included in the query to determine a variant of the data. However, any other dimensioning values may additionally or alternatively be used. In examples disclosed herein, the dimensioning values are identified at a time of configuration (and/or re-configuration) of the database by a database administrator. Such dimensioning values (e.g., columns, fields, etc.) are identified to the dimension identifier 220 and/or the partition manager 230 to enable the partitioning of the database along those dimensions.

In examples disclosed herein, the example dimension identifier 220 determines the dimensioning values based on the contents of the query received from the query source. However, in some examples, the example dimension identifier 220 may identify the dimensioning values based on metadata associated with the query such as, for example, a user identifier and/or tenant associated with the user identifier that submitted the query, a time at which the query was received, etc.

In the illustrated example of FIG. 2, the example partition manager 230 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. The example partition manager 230 of the illustrated example of FIG. 2, the example partition manager 230 selects a partition(s) to which the data is to be written based on the dimensioning values identified by the dimension identifier 220. In some examples, a single partition is identified. However, in some other examples, data may be received that is to be written to multiple partitions and, as a result, multiple partitions may be identified. The example partition manager 230 then determines whether the selected partition exists. If the selected partition does not exist, the example partition manager 230 instructs the example partition creator 250 to create the selected partition. The example partition creator 250 and/or the partition manager 230 stores the dimensioning values that were used in connection with the creation of the partition as an index (e.g., the index 263, 265, 267 of FIG. 2) so that the data stored in the partition can be more quickly identified at a later time.

In the illustrated example of FIG. 2, the example data writer 240 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. The example data writer 240 of the illustrated example of FIG. 2 writes the data to the selected partition.

In the illustrated example of FIG. 2, the example data reader 245 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. The example data reader 245 of the illustrated example of FIG. 2, reads data from the partition(s) identified by the example partition manager 230. In some examples, multiple different partitions are to be read by the data reader 245. In such examples, the example data reader 245 aggregates the data before providing a result to the query handler 210 for relay to the query source. In some examples, instead of aggregating the data, the data is sent to the query handler 210 without aggregation.

In the illustrated example of FIG. 2, the example partition creator 250 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. The example partition creator 250 of the illustrated example of FIG. 2, creates a selected partition at the direction of the partition manager 230. In some examples, the partition creator 250 stores the dimensioning values that were used in connection with the creation of the partition as an index (e.g., the index 263, 265, 267 of FIG. 2) so that the data stored in the partition can be more quickly identified at a later time.

The example database 260 of the illustrated example of FIG. 2 is implemented by any memory, storage device and/or storage disc for storing data such as, for example, flash memory, magnetic media, optical media, etc. Furthermore, the data stored in the example database 260 may be in any data format such as, for example, binary data, comma delimited data, tab delimited data, structured query language (SQL) structures, image data, etc. The example database 260 includes a set of partitions including a first partition 262, a second partition 264, and a third partition 266. Each of the partitions includes a corresponding index. For example, the first partition 262 includes a first index 263, the second partition 264 includes a second index 265, and the third partition 266 includes a third index 267.

While in the illustrated example of FIG. 2 three partitions are shown, any number of partitions may additionally or alternatively be used. Moreover, while in the illustrated example of FIG. 2, the indexes are shown as being included in each of their corresponding partition, in some examples the indexes may be stored separately from the partitions. In the illustrated example of FIG. 2, the partitions are shown as logical components of the same database. Such logical components need not necessarily be stored on the same storage device(s). That is, for example, the first partition 262 may be stored in a first storage device while the second partition 264 is stored in a second storage device separate from the first storage device.

In prior approaches, if a query source (e.g., an application) submitted a query to the database system 201 that required segmentation beyond time (e.g., by tenant and/or variant), the example prior database system would either create an index that includes tenant and/or variant for all indexes that need to be filtered by those values, or the database system 201 would scan all data within the first partition 110, the second partition 120, and the third partition 130 at runtime to select the appropriate records. With multi-dimensional partitions, example approaches disclosed herein enable data to be physically separated, thereby using the partitions as a first level of filtering (e.g., at the partition file level) that eliminates both the inefficiencies of including tenant and variant in each index and the need to scan non-relevant data.

Figure 3:
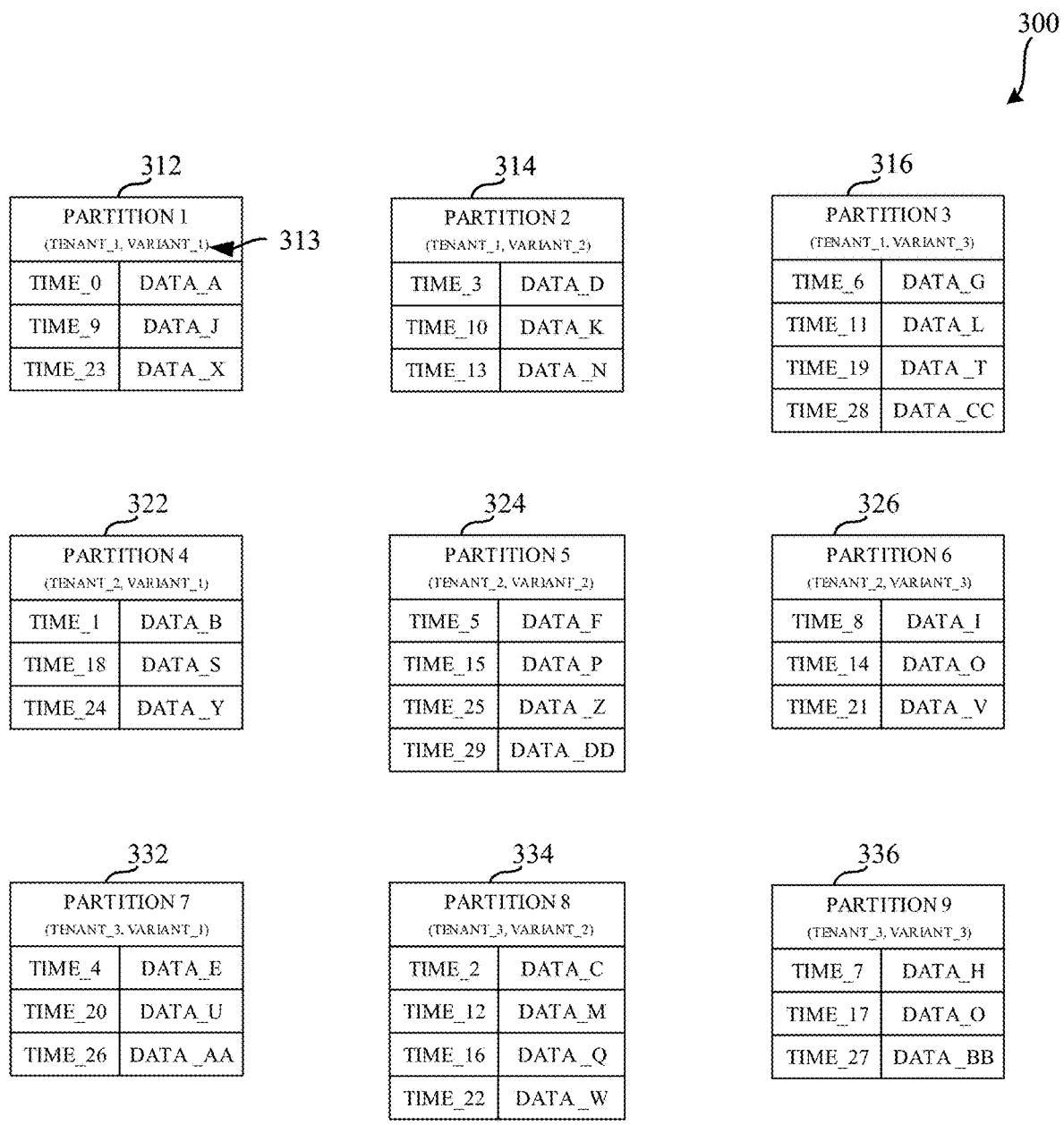
FIG. 3 is a block diagram illustrating an example approach to partitioning data using multiple fields for partitioning.

FIG. 3 is a block diagram illustrating an example approach 300 to partitioning data using multiple fields for partitioning. In the illustrated example of FIG. 3, instead of partitioning by time (as shown in FIG. 1), the stored data is partitioned by tenant and variant. The example partitioning approach 300 of FIG. 3 results in nine partitions 312, 314, 316, 322, 324, 326, 332, 334, 336. A first example partition 312 corresponds to data having a first tenant (e.g. tenant one) and a first variant (e.g., variant one). A second example partition 314 corresponds to data having a first tenant (e.g., tenant one) and a second variant (e.g., variant two). A third example partition 316 corresponds to data having a first tenant (e.g., tenant one) and a third variant (e.g., variant three). A fourth example partition 322 corresponds to data having a second tenant (e.g., tenant two) and a first variant (e.g., variant one). A fifth example partition 324 corresponds to data having a second tenant (e.g., tenant two) and a second variant (e.g., variant two). A sixth example partition 326 corresponds to data having a second tenant (e.g., tenant two) and a third variant (e.g., variant three). A seventh partition 332 corresponds to data having a third tenant (e.g., tenant three) and a first variant (e.g., variant one). An eighth example partition 334 corresponds to data having a third tenant (e.g., tenant three) and a second variant (e.g., variant two). A ninth example partition corresponds to data having a third tenant (e.g., tenant three) and a third variant (e.g., variant three).

In the illustrated example of FIG. 3 the data is not illustrated as being partitioned by time for the sake of clarity. However, in some examples, additional partitions may be created to further partition the data by time (e.g., by a time range corresponding to a particular partition). Moreover, any other field may additionally or alternatively be used to partition the data.

In the illustrated example of FIG. 3 each of the partitions includes an index identifying the corresponding tenant and variant of the data stored in that particular partition. For example, the first example partition 312 includes an index 313 identifying the first tenant (e.g., tenant one) and the first variant (e.g., variant one). While in the illustrated example of FIG. 3 the index is shown as being a component of the partition, in some examples the index (e.g., the first index 313) may be stored separately from the partition. In some examples, multiple indexes may be stored in a separate partition (e.g., an index partition).

In the illustrated example of FIG. 3, the partitioning scheme results in physical separation of the data, which acts as a first level filter. Such an approach reduces the need to scan multiple partitions to identify records that are responsive to a query and/or to write data. In some examples, there are further advantages to this kind of data separation in the context of scaled and clustered environments. For example, within a data cluster, there is a concept of hot data, where portions of data on various nodes are accessed more frequently than others. To eliminate resource hoarding on any given node(s), data is migrated or distributed across the cluster to better utilize all resources. If the data is already naturally segmented according the tenant ID (or any other value), this migration is trivial and does not require deconstruction and reconstruction of data partitions at a record level to migrate the data. Such data can therefore be migrated at a file level (e.g., a partition level) in an efficient manner.

While an example manner of implementing the database management system 201 is illustrated in FIG. 2, one or more of the elements, processes and/or devices illustrated in FIG. 2 may be combined, divided, re-arranged, omitted, eliminated and/or implemented in any other way. Further, the example query handler 210, the example dimension identifier 220, the example partition manager 230, the example data writer 240, the example data reader 245, the example partition creator 250, the example database 260, and/or, more generally, the example database management system 260 of FIG. 2 may be implemented by hardware, software, firmware and/or any combination of hardware, software and/or firmware. Thus, for example, any of the example query handler 210, the example dimension identifier 220, the example partition manager 230, the example data writer 240, the example data reader 245, the example partition creator 250, the example database 260, and/or, more generally, the example database management system 260 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example query handler 210, the example dimension identifier 220, the example partition manager 230, the example data writer 240, the example data reader 245, the example partition creator 250, the example database 260, and/or, more generally, the example database management system 260 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example database management system 201 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
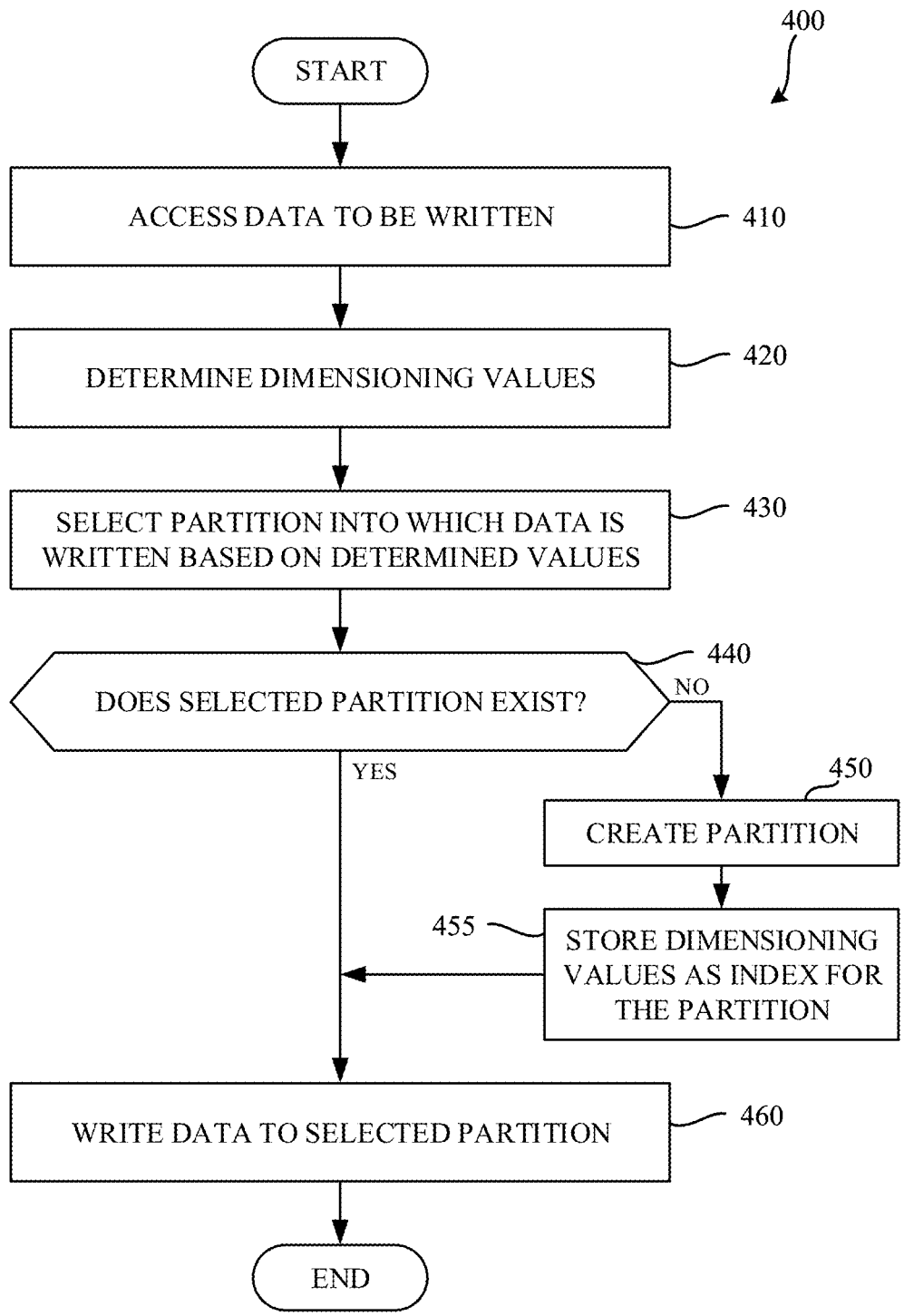
FIG. 4 is a flowchart representative of machine readable instructions which may be executed to implement the example database system of FIG. 2 to write data to a partition.

Flowcharts representative of example hardware logic or machine readable instructions for implementing the example database management system 201 are shown in FIGS. 4 and/or 5. The machine readable instructions may be a program or portion of a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and/or 5, many other methods of implementing the example database management system 201 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4 and/or 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 4 is a flowchart representative of machine readable instructions 400 which may be executed to implement the example database system 201 of FIG. 2 to write data to a partition. The example process 400 of the illustrated example of FIG. 4 begins at block 410 are the example query handler 210 accesses data to be written that is received via a query. (Block 410). In the illustrated example of FIG. 4 the query is a request to write data to the database. In the illustrated example of FIG. 4, the example query handler 210 receives the data to be written via a query from a query source. However, data to be written by me may be received in any other fashion.

The example dimension identifier 220 analyzes the data to be written to determine dimensioning values for that data. (Block 420). In examples disclosed herein, multiple dimensioning values are identified such as, for example, a tenant identifier, a variant identifier, a time identifier, etc. However, any other dimensioning values may additionally or alternatively be used. In examples disclosed herein, the example dimension identifier 220 determines the dimensioning values based on the contents of the query received from the query source. For example, the dimension identifier 220 determines a variant (e.g., a type and/or format) of unstructured data to be written. However, in some examples, the example dimension identifier 220 may identify the dimensioning values based on metadata associated with the query such as, for example, a user identifier and/or tenant associated with the user identifier that submitted the query, a time at which the query was received, etc.

The example partition manager 230 selects a partition(s) to which the data is to be written based on the identified dimensioning values. (Block 430). In the illustrated example of FIG. 4, a single partition is identified. However, in some other examples, data may be received that is to be written to multiple partitions and, as a result, multiple partitions may be identified. The example partition manager 230 then determines whether the selected partition exists. (Block 440). If the selected partition does not exist (e.g., block 440 returns a result of NO), the example partition creator 250 creates the selected partition. (Block 450). The example partition creator 250 then stores the dimensioning values that were used in connection with the creation of the partition as an index (e.g., the index 263, 265, 267 of FIG. 2) so that the data stored in the partition can be more quickly identified at a later time.

After creation of the selected partition (e.g., block 450) or an identification that the selected partition exists (e.g., block 440 returns a result of YES), the example data writer 240 writes the data to the selected partition. (Block 460). In some examples, the example query handler 210 provides an indication to the query source that the rating of the data is complete. The example process 400 of FIG. 4 then terminates, but may be repeated upon subsequent receipt of a query.

Figure 5:
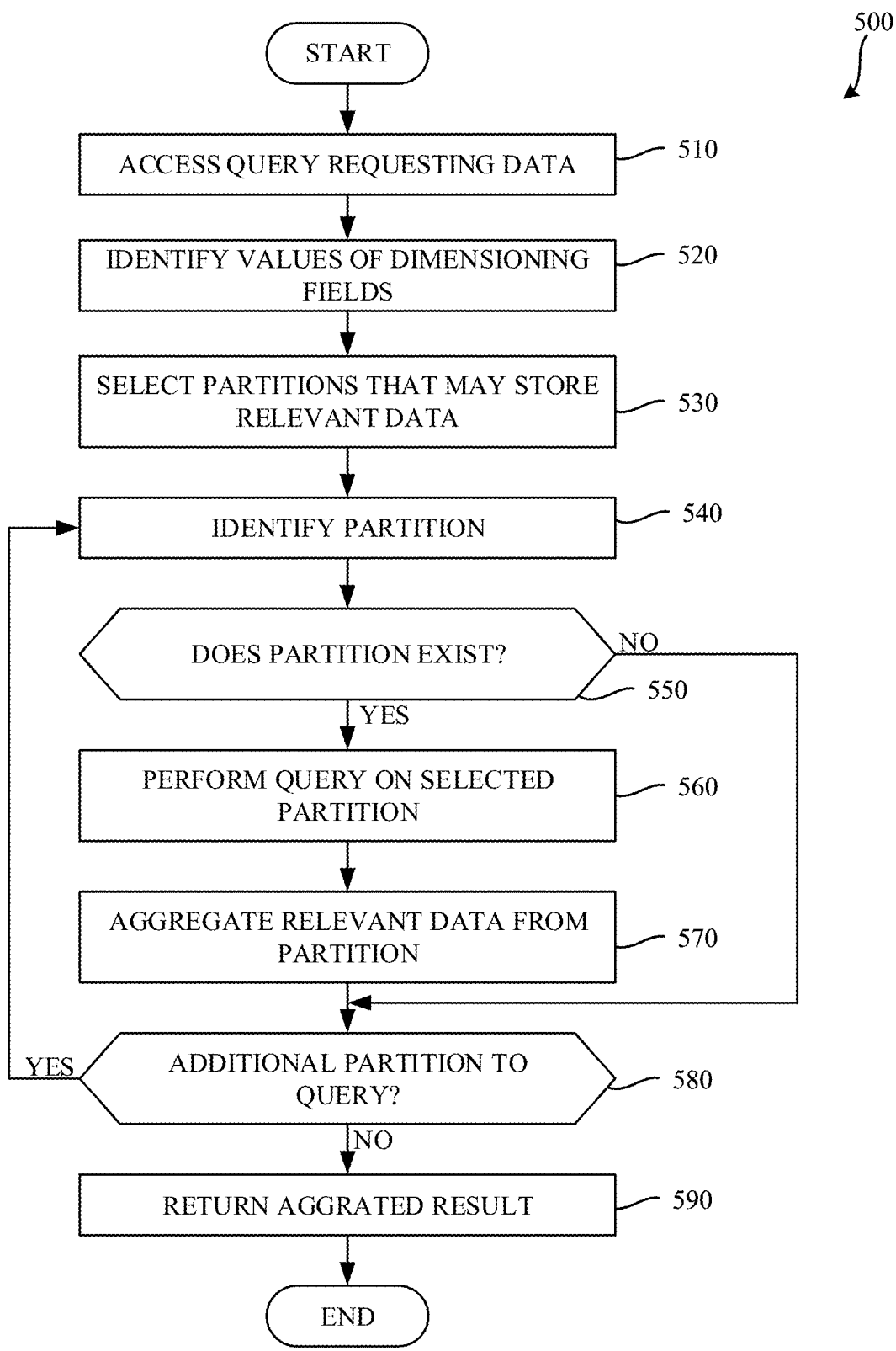
FIG. 5 is a flowchart representative of machine readable instructions which may be executed to implement the example database system of FIG. 2 to read data from a partition.

FIG. 5 is a flowchart representative of machine readable instructions 500 which may be executed to implement the example database system of FIG. 2 to read data from a partition. The example process 500 of the illustrated example of FIG. 5 begins when the example query handler 210 receives a query from a query source. (Block 510). In the illustrated example of FIG. 5 the query is a request to read data from the database. The example dimension identifier 220 identifies dimensioning values associated with the received query. (Block 520). As noted above, the dimensioning values may be, for example, a tenant identifier, a variant identifier, a timestamp, etc. In examples disclosed herein, the dimension identifier 220 identifies the dimensioning values based on the contents of the query. For example, the dimension identifier 220 determines a variant (e.g., a type and/or format) of unstructured data that may include the requested data. For example, if the query requested unstructured data including a particular field (e.g., addresses that include a zip code), only those variants that include addresses with a zip code would be identified. However, in some examples the dimension identifier 220 may identify that the dimensioning values using other metadata supplied in connection with the query such as, for example, a username and/or tenant associated with the username that submitted the query, a time at which the query was received, etc.

In some examples, a particular dimensioning value may not be identifiable by the dimension identifier 220. For example, a query may be received requesting all data for a particular tenant for a given timeframe, but is not specific with respect to which variants are to be returned. In such case, the dimension identifier 220 may indicate that all variant values are to be returned.

Using the identified dimensioning values, the example partition manager 230 selects partitions that may store relevant data. (Block 530). In examples disclosed herein the example partition manager 230 scans the indexes associated with the partitions and the database to identify relevant partitions (e.g., a partition that is associated with a particular tenant, a partition that includes data having a particular variant). In some examples, a single (e.g., condensed) index may be used by the example partition manager 230 to identify the partitions that may contain data relevant to the query. The example partition manager 230 selects a particular partition to be read by the data reader 245. (Block 550). The example partition manager 230 then determines whether the selected partition exists. (Block 550). If the example partition manager 230 determines that the partition exists (e.g., block 550 returns a result of YES), the example data reader 245 performs the query on the selected partition. (Block 560). The example data reader 245 aggregates the relevant data from the partition. (Block 570).

Returning to block 550, the example partition manager 230 may identify that a particular partition does not exist (e.g., block 550 returns a result of NO). In response to either determining that the selected partition does not exist (block 550 returning a result of NO), or the aggregation of the relevant data from the partition (block 570), the example partition manager 230 determines whether any additional partitions might include relevant data. (Block 580). The example process of blocks 540 through 580 is then repeated for the each of those additional partitions, until no additional partitions exist for aggregation of data (e.g., until block 580 returns a result of NO). Once all partitions have been queried (e.g., block 580 returns a result of NO), the example query handler 210 returns the aggregated results to the query source. (Block 590). The example process 500 of the illustrated example of FIG. 5 is then terminated, but may be reperformed in response to a subsequent query being received by the example query handler.

In the illustrated example of FIG. 5, the process of blocks 540 through 580 is illustrated in a serial fashion. That is, each partition that may contain relevant data is sequentially queried and its resultant data is aggregated. However, in some examples, the example process of blocks 540 through 580 may be performed in a parallel fashion. Performing such operations in a parallel fashion reduces the amount of time that may be required to respond to the query.

Figure 6:
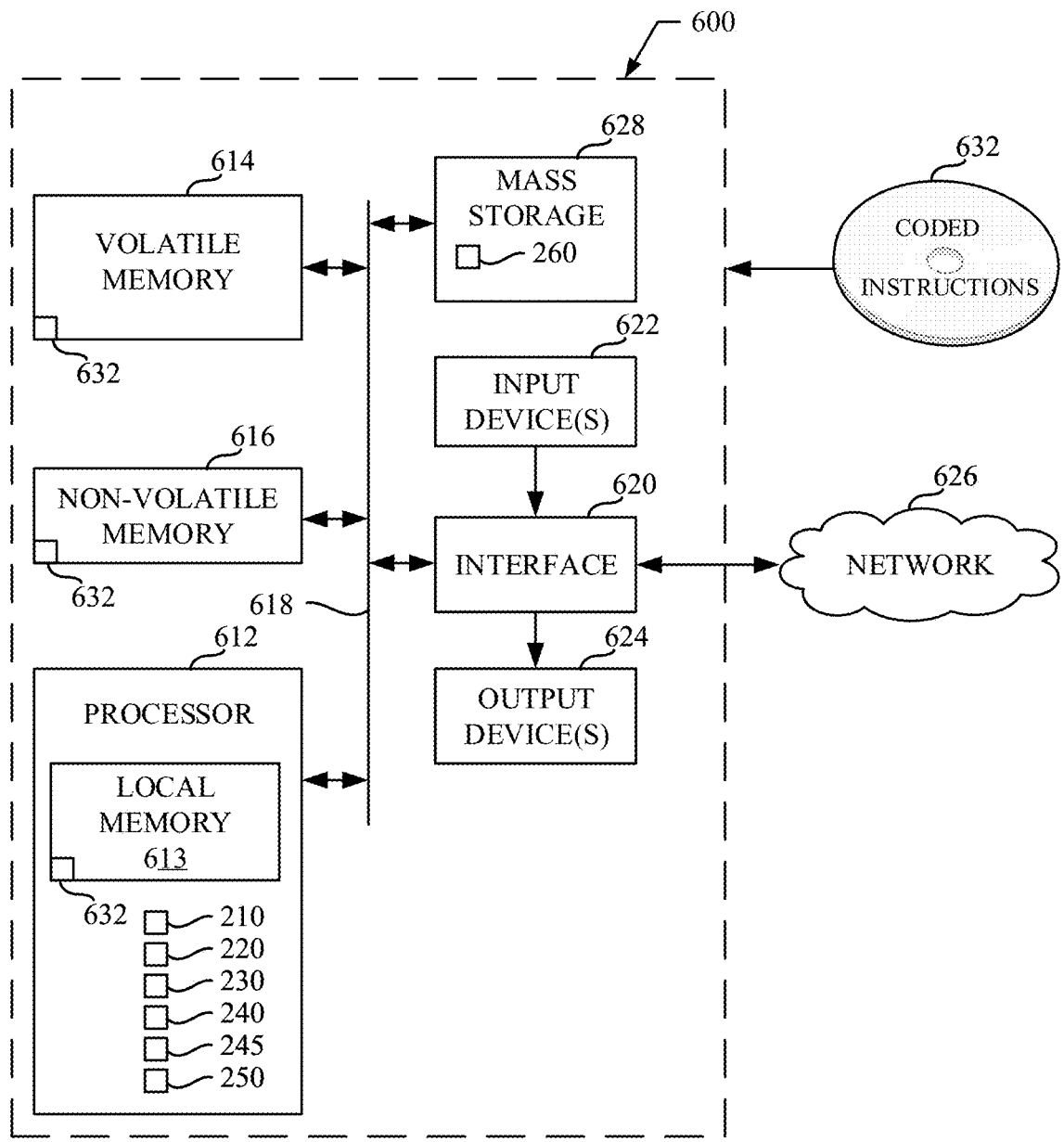
FIG. 6 is a block diagram of an example processing platform structured to execute the instructions of FIGS. 4 and/or 5 to implement the example database system of FIG. 2.

FIG. 6 is a block diagram of an example processor platform 600 structured to execute the instructions of FIGS. 4 and/or 5 to implement the database management system 201 of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example query handler 210, the example dimension identifier 220, the example partition manager 230, the example data writer 240, the example data reader 245, and the example partition creator 250.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

In the illustrated example of FIG. 6, the one or more mass storage devices 628 implement the example database 260. While in the illustrated example of FIG. 6, the example database 260 is implemented on a mass storage device of the processor platform 600, in some examples, the example database 260 and/or portions thereof (e.g., one or more partitions) may be implemented by mass storage devices of other processor platforms (e.g., in a distributed and/or clustered environment). In this manner, the processor platform 600 may communicate with such other processor platforms to read and/or write data to those partitions.

The machine executable instructions 632 of FIGS. 4 and/or 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that enable efficient partitioning of a database that stores unstructured data. By utilizing additional partitioning dimensions in addition to and/or in lieu of time, data can be more efficiently partitioned by, for example, a tenant identifier and/or a variant identifier. Using such partitioning is efficient in terms of resource utilization, as such an approach reduces any overhead (e.g., operational overhead, resource overhead, installation overhead, etc.) associated with providing separate database systems for each tenant.

Example 1 includes an apparatus to partition a database, the apparatus comprising a dimension identifier to identify at least two dimensioning values associated with a received query, the query including unstructured data to be written to a database, a partition manager to select a partition into which data is to be written based on the at least two dimensioning values, at least one of the at least two dimensioning values being a variant of unstructured data associated with the query, a partition creator to, in response to the selected partition not existing in the database, create the selected partition, and a data writer to write the data to the selected partition.

Example 2 includes the apparatus of example 1, wherein the at least two dimensioning values excludes time.

Example 3 includes the apparatus of example 1, wherein the at least two dimensioning values includes a tenant identifier.

Example 4 includes the apparatus of example 1, wherein the unstructured data uses a format identified by a variant identifier.

Example 5 includes the apparatus of example 1, wherein the partition creator is further to store the at least two dimensioning values as an index in association with the selected partition.

Example 6 includes the apparatus of example 1, wherein the query is a first query, the dimension identifier is to identify the at least two dimensioning values in connection with a second received query, the second query requesting the data, the partition manager is to select the partition for reading based on the at least two dimensioning values, and further including a data reader to read the data from the selected partition.

Example 7 includes a non-transitory computer-readable medium comprising instructions that, when executed, cause a machine to at least identify at least two dimensioning values associated with a received query, the query including unstructured data to be written to a database, select a partition into which data is to be written based on the at least two dimensioning values, at least one of the at least two dimensioning values being a variant of unstructured data associated with the query, in response to determining that the selected partition does not exist in the database, create the selected partition, and write the data to the selected partition.

Example 8 includes the non-transitory computer-readable medium of example 7, wherein the at least two dimensioning values excludes time.

Example 9 includes the non-transitory computer-readable medium of example 7, wherein the at least two dimensioning values includes a tenant identifier.

Example 10 includes the non-transitory computer-readable medium of example 9, wherein at least a portion of the unstructured data uses a format identified by a variant identifier.

Example 11 includes the non-transitory computer-readable medium of example 7, wherein the instructions, when executed, further cause the machine to at least store the at least two dimensioning values as an index in association with the selected partition.

Example 12 includes the non-transitory computer-readable medium of example 7, wherein the query is a first query, and the instructions, when executed, further cause the machine to at least identify the at least two dimensioning values in connection with a second received query, the second query requesting the data, select the partition for reading based on the at least two dimensioning values, and read the data from the selected partition.

Example 13 includes an apparatus to partition a database, the apparatus comprising means for identifying at least two dimensioning values associated with a received query, the query including unstructured data to be written to a database, means for selecting a partition into which data is to be written based on the at least two dimensioning values, at least one of the at least two dimensioning values being a variant of unstructured data associated with the query, means for creating, in response to determining that the selected partition does not exist in the database, the selected partition, and means for writing the data to the selected partition.

Example 14 includes the apparatus of example 13, wherein the at least two dimensioning values excludes time.

Example 15 includes the apparatus of example 13, wherein the at least two dimensioning values includes a tenant identifier.

Example 16 includes the apparatus of example 13, wherein at least a portion of the data to be stored is unstructured data having a format identified by a variant identifier.

Example 17 includes the apparatus of example 13, wherein the means for creating is further to store the at least two dimensioning values as an index in association with the selected partition.

Example 18 includes the apparatus of example 13, wherein the query is a first query, the means for identifying is further to identify the at least two dimensioning values in connection with a second received query, the second query requesting the data, the means for selecting is further to select the partition for reading based on the at least two dimensioning values, and further including means for reading the data from the selected partition.

Example 19 includes a method of partitioning a database, the method comprising identifying, by executing an instruction with at least one processor, at least two dimensioning values associated with a received query, the query including unstructured data to be written to a database, selecting, by executing an instruction with the at least one processor, a partition into which data is to be written based on the at least two dimensioning values, at least one of the at least two dimensioning values being a variant of unstructured data associated with the query, in response to determining that the selected partition does not exist in the database, creating the selected partition, and writing the data to the selected partition.

Example 20 includes the method of example 19, wherein the at least two dimensioning values excludes time.

Example 21 includes the method of example 19, wherein the at least two dimensioning values includes a tenant identifier.

Example 22 includes the method of example 19, wherein at least a portion of the unstructured data uses a format identified by a variant identifier.

Example 23 includes the method of example 19, further including storing the at least two dimensioning values as an index in association with the selected partition.

Example 24 includes the method of example 19, wherein the query is a first query, and further including identifying the at least two dimensioning values in connection with a second received query, the second query requesting the data, selecting the partition for reading based on the at least two dimensioning values, and reading the data from the selected partition.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to partition a database, the apparatus comprising:
   memory; and
   at least one processor including instructions that, when executed, cause the at least one processor to:
   obtain a first query and a second query, the first query including first unstructured data to be written to a database, the second query including second unstructured data to be written to the database;
   identify first dimensioning values associated with the first unstructured data and second dimensioning values associated with the second unstructured data, the first dimensioning values including a first tenant identifier and a first variant associated with the first unstructured data, the second dimensioning values including a second tenant identifier and a second variant associated with the second unstructured data, the second tenant identifier different from the first tenant identifier, the second variant different from the first variant;
   select a first partition into which the first unstructured data is to be written based on the first dimensioning values;
   select a second partition into which the second unstructured data is to be written based on the second dimensioning values, the second partition different from the first partition;
   in response to at least one of the first partition or the second partition not existing in the database, create the at least one of the first partition or the second partition;
   write the first unstructured data to the first partition; and
   write the second unstructured data to the second partition.

2. The apparatus of claim 1, wherein the first and second dimensioning values exclude time.

3. The apparatus of claim 1, wherein the first unstructured data uses a first format identified by a first variant identifier and the second unstructured data uses a second format identified by a second variant identifier.

4. The apparatus of claim 1, wherein the the instructions, when executed, cause the at least one processor to store the first dimensioning values as a first index in association with the first partition and store the second dimensioning values as a second index in associated with the second partition.

5. The apparatus of claim 1, wherein the instructions, when executed, cause the at least one processor to identify third dimensioning values in connection with a third query, the third query requesting data, the at least one processor to select at least one of the first partition or the second partition for reading based on the third dimensioning values, the at least one processor to read the data from the at least one of the first partition or the second partition.

6. A non-transitory computer-readable medium comprising instructions that, when executed, cause a machine to at least:
   obtain a first query and a second query, the first query including first unstructured data to be written to a database, the second query including second unstructured data to be written to the database;
   identify first dimensioning values associated with the first unstructured data and second dimensioning values associated with the second unstructured data, the first dimensioning values including a first tenant identifier and a first variant associated with the first unstructured data, the second dimensioning values including a second tenant identifier and a second variant associated with the second unstructured data, the second tenant identifier different from the first tenant identifier, the second variant different from the first variant;

select a first partition into which the first unstructured data is to be written based on the first dimensioning values;

select a second partition into which the second unstructured data is to be written based on the second dimensioning values, the second partition different from the first partition;

in response to determining that at least one of the first partition or the second partition does not exist in the database, create the at least one of the first partition of the second partition;

write the first unstructured data to the first partition; and write the second unstructured data to the second partition.

7. The non-transitory computer-readable medium of claim 6, wherein the first and second dimensioning values exclude time.

8. The non-transitory computer-readable medium of claim 6, wherein at least a first portion of the first unstructured data uses a first format identified by a first variant identifier and a second portion of the second unstructured data uses a second format identified by a second variant identifier.

9. The non-transitory computer-readable medium of claim 6, wherein the instructions, when executed, further cause the machine to at least store the first dimensioning values as a first index in association with the first partition and store the second dimensioning values as a second index in association with the second partition.

10. The non-transitory computer-readable medium of claim 6, wherein the instructions, when executed, further cause the machine to at least:

identify third dimensioning values in connection with a third query, the third query requesting data;

select at least one of the first partition or the second partition for reading based on the third dimensioning values; and read the data from the at least one of the first partition or the second partition.

11. An apparatus to partition a database, the apparatus comprising:

means for identifying first dimensioning values associated with first unstructured data from a first query and second dimensioning values associated with second unstructured data from a second query, first unstructured data and the second unstructured data to be written to a database, the first dimensioning values including a first tenant identifier and a first variant associated with the first unstructured data, the second dimensioning values including a second tenant identifier and a second variant associated with the second unstructured data, the second tenant identifier different from the first tenant identifier, the second variant different from the first variant;

means for selecting a first partition into which the first unstructured data is to be written based on the first dimensioning values;

means for selecting a second partition into which the second unstructured data is to be written based on the second dimensioning values, the second partition different from the first partition;

means for creating, in response to determining that at least one of the first partition or the second partition does not exist in the database, the at least one of the first partition or the second partition;

means for writing the first unstructured data to the first partition; and means for writing the second unstructured data to the second partition.

12. The apparatus of claim 11, wherein the first and second dimensioning values exclude time.

13. The apparatus of claim 11, wherein at least a first portion of the first unstructured data to be stored has a first format identified by a first variant identifier and at least a second portion of the second unstructured data to be stored has a second format identified by a second variant identifier.

14. The apparatus of claim 11, wherein the means for creating is further to store the first dimensioning values as a first index in association with the first partition and store the second dimensioning values as a second index in associated with the second partition.

15. The apparatus of claim 11, wherein the means for identifying is further to identify third dimensioning values in connection with a third query, the third query requesting data, the means for selecting is further to select at least one of the first partition or the second partition for reading based on the third dimensioning values, and further including means for reading the data from the at least one of the first partition or the second partition.

* * * * *

UNITED STATES PATENT AND TRADEMARK OFFICE
CERTIFICATE OF CORRECTION

PATENT NO. : 11,288,287 B2
APPLICATION NO. : 16/050705
DATED : March 29, 2022
INVENTOR(S) : Brian Howard Stewart, Brian Roland Rhees and Seth D. Grover It is certified that error appears in the above-identified patent and that said Letters Patent is hereby corrected as shown below:

In the Claims

Column 14, Line 41 (Claim 4):
Replace "wherein the the instructions" with --wherein the instructions--.

Signed and Sealed this
Twelfth Day of July, 2022

Katherine Kelly Vidal
*Director of the United States Patent and Trademark Office*